United States Patent [19]

Ito et al.

[11] Patent Number: 4,594,642

[45] Date of Patent: Jun. 10, 1986

[54] IMPREGNATING OIL FOR A CAPACITOR COMPRISING TWO METALLIZED PLASTIC FILMS AND THE CAPACITOR IMPREGNATED WITH THE OIL

[75] Inventors: Akira Ito; Toshishige Ueno, both of Iwaki, Japan

[73] Assignee: Kureha Kagaku Kogyo Kabushiki Kaisha, Tokyo, Japan

[21] Appl. No.: 729,352

[22] Filed: May 1, 1985

Related U.S. Application Data

[63] Continuation-in-part of Ser. No. 613,400, May 24, 1984, abandoned.

[30] Foreign Application Priority Data

Aug. 19, 1983 [JP] Japan .................. 58-151422

[51] Int. Cl.$^4$ .......................... H01G 4/22; H01B 3/20
[52] U.S. Cl. ...................... 361/315; 174/17 LF; 252/576; 361/319; 585/6.3
[58] Field of Search ................ 252/576; 585/6.3, 6.6; 174/17 LF; 361/315, 319

[56] References Cited

U.S. PATENT DOCUMENTS

4,317,159  2/1982  Dequasie ........................... 361/318
4,449,163  5/1984  Dequasie et al. .................. 361/315
4,493,943  1/1985  Sato et al. ......................... 252/570

FOREIGN PATENT DOCUMENTS

788667  2/1955  United Kingdom .

Primary Examiner—Paul Lieberman
Assistant Examiner—Robert A. Wax
Attorney, Agent, or Firm—Cushman, Darby & Cushman

[57] ABSTRACT

Disclosed herein are an impregnating oil prepared by admixing an isocyanate compound of tolylene diisocyanate and/or 4,4-diisocyanate-3,3-dimethyldiphenyl with an insulating oil of 1-tolyl-2-phenylethane, 1-ethylphenyl-2-phenylethane, 1-isopropylphenyl-2-phenylethane and/or 1,2-ditolylethane and a capacitor comprising two metallized plastic films impregnated with the thus prepared impregnating oil.

3 Claims, No Drawings

IMPREGNATING OIL FOR A CAPACITOR COMPRISING TWO METALLIZED PLASTIC FILMS AND THE CAPACITOR IMPREGNATED WITH THE OIL

CROSS-REFERENCE TO RELATED APPLICATION

The present application is a continuation-in-part of U.S. patent application Ser. No. 613,400 filed May 24, 1984, now abandoned.

BACKGROUND OF THE INVENTION

The present invention relates to an impregnating oil as a dielectric medium for a capacitor, prepared by admixing 0.1 to 10 parts by weight of an isocyanate-compound of tolylene diisocyanate and/or 4,4-diisocyanate-3,3-dimethyldiphenyl with 100 parts by weight of an insulating oil of 1-tolyl-2-phenylethane, 1-ethylphenyl-2-phenylethane, 1-isopropylphenyl-2-phenylethane and/or 1,2-ditolylethane, and an oil impregnated capacitor comprising at least two plastic films repectively coated with a vacuum-evaporated metal on one surface thereof (hereinafter referred to as the metallized plastic film capacitor) and impregnated with the thus prepared impregnating oil.

The capacitor having an element prepared by piling at least two films respectively coated on one of the surfaces thereof with a vacuum-evaporated metal (such a film is hereinafter referred to as the metallized film) such that the metallized surface of one of the two metallized films is contacted with the non-metallized surface of the other metallized film, winding the thus piled films and impregnating with an insulating oil shows an excellent self-healing properties for the dielectric breakdown and has a merit of the possibility of being available in small size and light weight. However, on the other hand, a demerit of capacitance decrease of such a type of capacitors during use under high voltage owing to the partial oxidation of the metal from the metallized surface of the metallized film has been recognized. Further, in case of applying higher dielectric stress on the capacitor, the capacitance decrease is easily apt to occur, and such a capacitance decrease is more easily caused in the case where the vaccum-evaporated metal is, for instance aluminium.

Several reasons are considered as the cause of the capacitance decrease in the capacitors, for example, (1) the presence of the partial oxidation of the metal of the metallized film caused by the presence of moisture both in the element of the capacitor and in the insulating oil, (2) the presence of phenolic antioxidants contained in polypropylene film and (3) the presence of a soldering paste containing rosin used for welding a lead wire to the sprayed metal of the capacitor element. Accordingly, in order to prevent the capacitance decrease in such a type of capacitors, particularly metallized polypropylene film capacitors (hereinafter referred to as MPP capacitors), methods for removing moisture from the insulating oil and/or the element thereof have been studied. However, because of the difficulty of completely removing the moisture industrially and experimentally, it has been impossible to sufficiently prevent the capacitance decrease of MPP capacitors.

Further, although trials have been carried out by thickening the metal layer on the metallized film for preventing the capacitance decrease of MPP capacitors, since the self-healing property of MPP capacitors becomes poorer with the thickening of the metal layer and as a result, the specific merit of the capacitor provided with an element comprising the metallized films impregnated with the impregnating oil is spoiled, such a method cannot provide any capacitors having an element comprising the metallized films impregnated with the impregnating oil of a practical value.

Furthermore, although the capacitance decrease of MPP capacitors is improved to a certain extent by substituting zinc for aluminum as a vacuum-evaporated metal, since the zinc layer of the metallized film is inferior in the oxidation stability in air to the aluminum metallized film, the zinc metallized film has a demerit of necessitating troublesome treating thereof.

As a result of the studies of the inventors of the present invention, it is found that the addition of the isocyanate compound of tolylene diisocyanate and/or 4,4-diisocyanate-3,3-dimethyldiphenyl to the insulating oil of 1-tolyl-2-phenylethane, 1-ethylphenyl-2-phenylethane 1-isopropylphenyl-2-phenylethane and/or 1,2-ditolylethane affects the moisture content of the capacitor element, and the present invention has been attained.

SUMMARY OF THE INVENTION

In a first aspect of the invention, there is provided an impregnating oil for a metallized plastic film capacitor comprising 0.1 to 10 parts by weight of an isocyanate compound selected from the group consisting of tolylene diisocyanate, 4,4-diisocyanate-3,3-dimethyldiphenyl and the mixture thereof and 100 parts by weight of an electric insulating oil selected from the group consisting of 1-tolyl-2-phenylethane, 1-ethylphenyl-2-phenylethane, 1-isopropylphenyl-2-phenylethane, 1,2-ditolylethane and the mixture thereof.

In a second aspect of the present invention, there is provided a metallized plastic film capacitor comprising at least two metallized plastic films impregnated with an impregnating oil prepared by admixing 0.1 to 10 parts by weight of an isocyanate compound selected from the group consisting of tolylene diisocyanate, 4,4-diisocyanate-3,3-dimethyldiphenyl and the mixture thereof with 100 parts by weight of an insulating oil selected from the group consisting of 1-tolyl-2-phenylethane, 1-ethylphenyl-2-phenylethane, 1-isopropylphenyl-2-phenylethane, 1,2-ditolylethane and the mixture thereof.

In a third aspect of the present invention there is provided a process for producing a metallized plastic film capacitor, comprising impregnating an element prepared by piling at least two metallized films and winding the piled film with an impregnating oil prepared by admixing 0.1 to 10 parts by weight of an isocyanate compound selected from the group consisting of tolylene diisocyanate, 4,4-diisocyanate-3,3-dimethyldiphenyl and the mixture thereof with 100 parts by weight of an insulating oil selected from the group consisting of 1-tolyl-2-phenylethane, 1-ethylphenyl-2-phenylethane, 1-isopropylphenyl-2-phenylethane, 1,2-ditolylethane and the mixture thereof at a temperature of not more than 40° C.

DETAILED DESCRIPTION OF THE INVENTION

An impregnating oil for a metallized plastic film capacitor according to the present invention comprises 0.1 to 10 parts by weight of an isocyanate compound selected from the group consisting of tolylene diisocyanate, 4,4-diisocyanate-3,3-dimethyldiphenyl and the mixture thereof and 100 parts by weight of an electric insulating oil selected from the group consisting of 1-tolyl-2-phenylethane, 1-ethylphenyl-2-phenylethane, 1-isopropylphenyl-2-phenylethane, 1,2-ditolylethane and the mixture thereof, and a metallized plastic film capacitor according to the present invention comprises at least two metallized plastic films impregnated with an impregnating oil prepared by admixing 0.1 to 10 parts by weight of an isocyanate compound selected from the group consisting of tolylene diisocyanate, 4,4-diisocyanate-3,3-dimethyldiphenyl and the mixture thereof with 100 parts by weight of an insulating oil selected from the group consisting of 1-tolyl-2-phenylethane, 1-ethylphenyl-2-phenylethane, 1-isopropylphenyl-2-phenylethane, 1,2-ditolylethane and the mixture thereof.

A metallized plastic film capacitor according to the present invention is produced by impregnating an element obtained by piling at least two metallized films and winding the piled film with an impregnating oil obtained by admixing 0.1 to 10 parts by weight of an isocyanate compound selected from the group consisting cf tolyelene diisocyanate, 4,4-diisocyanate-3,3-dimethyldiphenyl and the mixture thereof with 100 parts by weight of an insulating oil selected from the group consisting of 1-tolyl-2-phenylethane, 1-ethylphenyl-2-phenylethane, 1-isopropylphenyl-2-phenylethane, 1,2-ditolylethane and the mixture thereof at a temperature of not more than 40° C., preferably 0° to 35° C. for 20 to 30 hours.

In the case where an insulating oil thus prepared is used as the dielectric medium for an MPP capacitor it is presumed that the minute amount of moisture which still remains on and/or in the element even after vacuum-drying the element under heating is removed by the chemical reaction with the isocyanate-group in the isocyanate compound, and as a result, the capacitance decrease of the capacitor due to the moisture is effectively prevented.

The oil-impregnation into the element is carried out at a temperature of less than 40° C., preferably 0° to 35° C. for 20 to 30 hours under a highly reduced pressure (vacuum), for example, less than 0.05 mmHg.

Although the amount of addition of the isocyanate-compound to the above-mentioned insulating oil depends on the state of dryness (moisture content) of the element comprising the metallized film, the width of the metallized film and the kinds of the isocyanate-compound used, the amount is ordinarily 0.1 to 10 parts by weight to 100 parts by weight of the insulating oil.

As a plastic film of the capacitor element according to the present invention, polypropylene film is suitable.

The wound films as an element for the capacitor according to the present invention has one of the following constructions.

(1) The element consists of at least two metallized films having a non-metallized rough surface, respectivity.

(2) The element consists of at least two metallized films and at least one plastic film, the plastic film being disposed between the two metallized films, the metallized surface being in contact with the rough surface of the plastic film and at least one of the non-metallized surfaces mutually contacted being rough surface.

As stated above, the capacitor having, as the element, aluminium metallized film impregnated with the impregnating oil according to the present invention is effectively prevented against the capacitance decrease thereof and the dielectric characteristics of the capacitor itself are not degenerated.

The present invention will be explained more in detail while referring to the following non-limitative examples.

EXAMPLE 1

Each element for a capacitor of a capacitance of 1 $\mu$F is prepared by winding two aluminium metallized polypropylene films each being 10 $\mu$m in thickness and 100 mm in width while leaving a margin of 5 mm in width from either edge of the films. The elements were dried at 80° C. under a reduced pressure of 0.01 mmHg for 3 days and then impregnated with a mixture of 100 parts by weight of insulating oil shown in Table 1 and an amount of respective isocyanate compounds shown in Table 1. to obtain the capacitors according to the present invention.

Onto each of the thus prepared capacitors, an alternating current of 1200 V (filed strength: 80 V/$\mu$m) or 1500 V (filed strength: 100 V/$\mu$m) was applied and the capacitance decrease from the initial value after the applied voltage was measured.

The results are shown in Table 1.

TABLE 1

|  | Insulting Oil | Isocyanate Compound | | Filed Strength (V/$\mu$m) | Capacitance Decrease (%) | | |
|---|---|---|---|---|---|---|---|
|  |  | Name | Amount[1] |  | 1000 hrs | 2000 hrs | 4000 hrs |
| Present Invention | 1-tolyl-2-phenylethane | tolylene diisocyanate | 1 | 80 | 0 | 0 | 0 |
|  | 1-tolyl-2-phenylethane | tolylene diisocyanate | 2 | 80 | 0 | 0 | 0 |
|  | 1-tolyl-2-phenylethane | tolylene diisocyanate | 2 | 100 | 0 | 0 | 0 |
|  | 1-tolyl-2-phenylethane | 4,4-diisocyanate-3,3-dimethyldiphenyl | 2 | 80 | 0 | 0 | 0 |
|  | 1-ethylphenyl-2-phenylethane | tolylene diisocyanate | 2 | 80 | 0 | 0 | 0 |
|  | 1-ethylphenyl-2-phenylethane | 4,4-diisocyanate-3,3-dimethyldiphenyl | 2 | 80 | 0 | 0 | 0 |
|  | 1-isopropyl-phenyl-2-phenylethane | tolylene diisocyanate | 2 | 80 | 0 | 0 | 0 |
|  | 1-isopropyl-phenyl-2-phenylethane | 4,4-diisocyanate-3,3-dimethyldiphenyl | 2 | 80 | 0 | 0 | 0 |
|  | 1,2-diotolyl-ethane | tolylene diisocyanate | 2 | 80 | 0 | 0 | 0 |
| Comparative | 1-tolyl-2-phenylethane | diphenylmethane diisocyanate | 2 | 80 | 0 | 0.25 | 8.5 |

TABLE 1-continued

| Insulting Oil | Isocyanate Compound | | Filed Strength (V/μm) | Capacitance Decrease (%) | | |
| --- | --- | --- | --- | --- | --- | --- |
| | Name | Amount[1] | | 1000 hrs | 2000 hrs | 4000 hrs |
| Specimen | | | | | | |
| 1-tolyl-2-phenylethane | prepolymer with 7-9% free isocyanate diphenylmethane diisocyanate with 33.4% free isocyanate | 2 | 80 | 0 | 0.7 | 2.9 |
| 1-ethylphenyl-2-phenylethane | diphenylmethane diisocyanate prepolymer with 7-9% free isocyanate | 2 | 80 | 0 | 2.7 | 8.5 |
| 1-isopropyl-phenyl-2-phenylethane | diphenylmethane diisocyanate prepolymer with 7-9% free isocyanate | 2 | 80 | 0 | 2.7 | 8.6 |
| dixylylethane | tolylene diisocyanate | 2 | 80 | 0 | 1.5 | 4.5 |
| dixylylethane | 4,4-diisocyanate-3,3-dimethyldiphenyl | 2 | 80 | 0.8 | 6.3 | 15.2 |

Note: [1]Parts by weight to 100 parts by weight of insulating oil.

As are seen in Table 2, those capacitors impregnated with the impregnating oil according to the present invention do not show any capacitance decrease even after 4000 hours due to the very small dielectric loss and not cause partial discharge therein.

On the other hand, the capacitors of the comparative specimen, impregnated with the impregnating oil prepared by mixing dixylylethane with tolylene diisocyanate or 4,4-diisocyanate-3,3-diethyldiphenyl show the capacitance decrease within 2000 hours. This is due to the high viscosity of the thus mixed impregnating oil resulting in insufficient impregnation with the oil.

Further, the capacitors of the comparative specimen, impregnated with the impregnating oil prepared by mixing each of 1-tolyl-2-phenylethane, 1-ethylphenyl-2-phenylethane, 1-isopropylphenyl-2-phenylethane and 1,2-ditolylethane with diphenylmethane diisocyanate with 33.4% free isocyanate or diphenylmethane diisocyanate prepolymer with 7-9% free isocyanate, show capacitance decrease within 2000 hours because the dielectric loss thereof increases as a result of causing thermal deterioration of the dielectric.

EXAMPLE 2

After drying for 3 days at 80° C. under a reduced pressure of 0.01 mmHg each of the elements for capacitor prepared by the same procedures as in Example 1, an impregnating oil prepared by mixing 2 parts by weight of 4,4-diisocyanate-3,3-dimethyldiphenyl as an isocyanate compound and 100 parts by weight of 1-isopropylphenyl-2-pehnylethane was impregnated into the thus prepared and dried element to obtain capacitor. In addition, as a comparative specimen, a capacitor was prepared by impregnating only 1-isopropylphenyl-2-phenylethane into the same designed element.

The effectiveness of prevention of the capacitor against the reduction of the capacitance thereof was evaluated by the same procedures as in Example 1, and the results are shown in Table 2.

TABLE 2

| | Isocyanate-compound | Time for loading alternating voltage (hours) |
| --- | --- | --- |
| Present invention | 4,4'-diisocyanate-3,3'-dimethyldiphenyl | >1500 |
| Comparative specimen | none | 150 |

EXAMPLE 3

Dielectric loss of the capacitors according to the present invention respectively prepared in Example 1 while using a mixture of an insulating oil shown in Table 3 and an isocyanate compound shown in Table 3 was measured at a temperatures of 80° C. The results are shown in Table 3.

TABLE 3

| | Insulating Oil | Isocyanate Compound | | Dielectric Loss (%, at 80° C.) | |
| --- | --- | --- | --- | --- | --- |
| | | Name | Amount[1] | Insulating Oil | Capacitor |
| Present Invention | 1-tolyl-2-phenylethane | tolylene diisocyanate | 2 | 0.13 | 0.037 |
| | 1-ethylphenyl-2-phenylethane | 4,4-diisocyanate-3,3-dimethyldiphenyl | 2 | 0.13 | 0.037 |
| | 1-isopropylphenyl-2-phenylethane | tolylene diisocyanate | 1 | 0.10 | 0.035 |
| | 1-isopropylphenyl-2-phenylethane | tolylene diisocyanate | 2 | 0.13 | 0.037 |
| | 1-isopropylphenyl-2-phenylethane | 4,4-diisocyanate-3,3-dimethyldiphenyl | 2 | 0.13 | 0.037 |
| Comparative Specimen | 1-tolyl-2-phenylethane | diphenylmethane diisocyanate with 33.4% free isocyanate | 2 | 0.22 | 0.053 |
| | 1-tolyl-2-phenylethane | diphenylmethane diisocyanate prepolymer with 7-9% free | 2 | 2.35 | 0.172 |

TABLE 3-continued

|  | Insulating Oil | Isocyanate Compound | | Dielectric Loss (%, at 80° C.) | |
|---|---|---|---|---|---|
|  |  | Name | Amount[1] | Insulating Oil | Capacitor |
| Compara- tive Specimen | 1-isopropylphenyl-2- phenylethane | isocyanate — | 0 | 0.01 | 0.035 |
|  | dixylylethane | diphenylmethane diisocyanate with 33.4% free isocyanate | 2 | 0.24 | 0.053 |
|  | dixylylethane | diphenylmethane diisocyanate pre- polymer with 7-9% free isocyanate | 2 | 2.35 | 0.180 |

Note: [1]Part by weight to 100 parts by weight of insulating oil.

As are seen in Table 3, the impregnating oil according to the present invention exhibits an excellent effectiveness in preventing the capacitance decrease of a capacitor having an element comprising an aluminium metallized plastic film, and furthermore, even in the case of using an insulating oil mixed with the isocyanate compound according to the present invention, the dielectric loss of the thus prepared capacitor does not differ substantially from that of the conventional capacitor impregnated with the same insulating oil without any addition of any isocyanate compound.

EXAMPLE 4

Six kinds of wound films as the element for a capacitor of a capacitance of 2 μF were prepared while using the elements as seen from Table 4. Namely, in the order, for instance, from top to bottom of metallized film/non-metallized film/metallized film/non-metallized film.

In Table 4, those classified as A (A-1, A-2 and A-3) are the wound films according to the present invention satisfying the following two conditions, namely, (1) the metallized surface is contacted with the roughly processed surface of a non-metallized polypropylene film and (2) at least one of the two non-metallized surfaces mutually contacted is roughly processed. On the other hand, in those classified as B (B-1, B-2 and B-3), (1) the metallized surface is contacted with the smooth surface of a non-metallized polypropylene film, or (2) two non-metallized surfaces mutually contacted are smooth.

TABLE 4

| Code No. of Element | Composition of Films | |
|---|---|---|
|  | Metallized polypropylene film | Polypropylene film |
| A-1 | One of the two smooth surfaces was metallized with aluminum | both surfaces were roughly pro- cessed |
| A-2 | the smooth surface was metallized with aluminum and the other surface was rough | the same as above |
| A-3 | the same as above | one surface was roughly pro- cessed |
| B-1 | one of the two smooth surfaces was metallized with aluminum | the same as above |
| B-2 | the same as above | two surfaces were smooth |
| B-3 | the smooth surface as metallized with aluminum and the other surface was rought | the same as above |

The thus prepared six kinds of elements were impregnated with each of the following two kinds of impregnants.

(a) 1-isopropylphenyl-2-phenylethane (1,2-CPE), (b) a mixture of 99.5% by weight of 1,2-CPE and 0.5% by weight of 4,4-diisocyanate-3,3-dimethyl-diphenyl.

The respective partial discharge properties and the change of the capacitance with the lapse of time of the thus obtained capacitors are shown in Tables 5 and 6.

As are seen in Tables 5 and 6, the capacitors provided with, as the element thereof, wound films in which (1) the metallized surface of a metallized film is contacted with the roughly processed side of a polypropylene film and (2) at least one of the two non-metallized surfaces mutually contacted, one of which belongs to one plastic film and the other of which belongs to another plastic film is roughly processed and which is impregnated with an insulating oil admixed with an isocyanate-compound according to the present invention is superior in the partial discharge property and substantially does not show the capacitance decrease thereof after a long term of applying a high voltage.

TABLE 5

| Partial Discharge Stress | | | | | | | |
|---|---|---|---|---|---|---|---|
|  |  | Partial Discharge Stress | | | | | Unit: V/μm |
| Wound film (element) |  | A-1 | A-2 | A-3 | B-1 | B-2 | B-3 |
| Impregnating oil |  |  |  |  |  |  |  |
| 1,2-CPE plus 4,4- | DIS[1] | 158 | 158 | 159 | 135 | 130 | 135 |
| diisocyanate-3,3- dimethyl-diphenyl | DES[2] | 113 | 114 | 114 | 47 | 46 | 45 |
| 1,2-CPE alone | DIS | 158 | 158 | 159 | 135 | 130 | 135 |
|  | DES | 113 | 114 | 114 | 47 | 46 | 45 |

Notes:
[1]Partial discharge inception stress;
[2]Partial discharge exception stress.

TABLE 6

Change of Capacitance of Capacitors with Time
shown by Percentage of the Survival Capacitance Unit: % of Initial Capacitance

| Impregnated oil | Elements | | | | | |
|---|---|---|---|---|---|---|
| | A-1 | A-2 | A-3 | B-1 | B-2 | B-3 |
| 1,2-CPE plus isocyanate-compound[1] | 100 | 100 | 100 | 100 | 77 | 83 |
| 1,2-CPE alone[2] | 87 | 86 | 87 | 83 | 85 | 86 |

Notes: Data under the conditions of: at 40° C. of ambient temperature and under 80 V/$\mu$m of the electric field,
[1] After 2000 hours of applying, the capacitor impregnated with a mixture of each indicated insulating oil and 4,4'-diisocyanate-3,3'-dimethyldiphenyl.
[2] after 200 hours of applying, the capacitor impregnated with each indicated insulating oil alone.

Accordingly, the industrial value of the present invention is large for preventing the capacitance decrease of a capacitor having metallized films as the element thereof.

What is claimed is:

1. An impregnating oil for a metallized plastic film capacitor, comprising 0.1 to 10 parts by weight of an isocyanate compound selected from the group consisting of tolylene diisocyanate, 4,4'-diisocyanate-3,3'-dimethyldiphenyl and the mixture thereof and 100 parts by weight of an electric insulating oil selected from the group consisting of 1-tolyl-2-phenylethane, 1-ethylphenyl-2-phenylethane, 1-isopropylphenyl-2-phenylethane, 1,2-ditolylethane and the mixture thereof.

2. A metallized plastic film capacitor comprising at least two metallized plastic films impregnated with an impregnating oil prepared by admixing 0.1 to 10 parts by weight of an isocyanate compound selected from the group consisting of tolylene diisocyanate, 4,4'-diisocyanate-3,3'-dimethyldiphenyl and the mixture thereof with 100 parts by weight of an insulating oil selected from the group consisting of 1-tolyl-2-phenylethane, 1-ethylphenyl-2-phenylethane, 1-isopropylphenyl-2-phenylethane, 1,2-ditolylethane and the mixture thereof.

3. A process for producing a metallized plastic film capacitor of claim 2, comprising impregnating an element prepared by piling at least two metallized films and winding the piled film with an impregnating oil prepared by admixing 0.1 to 10 parts by weight of an isocyanate compound selected from the group consisting of tolylene diisocyanate, 4,4'-diisocyanate-3,3'-dimethyldiphenyl and the mixture thereof with 100 parts by weight of an electric insulating oil selected from the group consisting of 1-tolyl-2-phenylethane, 1-ethylphenyl-2-phenylethane, 1-isopropylphenyl-2-phenylethane, 1,2-ditolylethane and the mixture thereof at a temperature of not more than 40° C.

* * * * *